United States Patent [19]
Reiger, Jr.

[11] 3,901,454
[45] Aug. 26, 1975

[54] FORM RETAINER AND INSULATOR BACKUP ASSEMBLY FOR STATOR WINDING MACHINES

[75] Inventor: Arthur C. Reiger, Jr., Dayton, Ohio

[73] Assignee: The Globe Tool and Engineering Company, Dayton, Ohio

[22] Filed: June 19, 1974

[21] Appl. No.: 480,955

[52] U.S. Cl............... 242/1.1 R; 29/205 R; 29/596
[51] Int. Cl.² ..................................... H02K 15/085
[58] Field of Search.............. 242/1.1 R, 1.1 A, 596, 242/205 R

[56] References Cited
UNITED STATES PATENTS
3,412,947 11/1968 Reichert et al. ................ 242/1.1 R
R25,281 11/1962 Moore............................ 242/1.1 R

*Primary Examiner*—Billy S. Taylor
*Attorney, Agent, or Firm*—Dybvig & Dybvig

[57] ABSTRACT

Two relatively movable plates are provided for retaining winding forms and for backing up insulating cells or liners, especially for use in winding stators with relatively heavy wire. The two plates move together until the one plate engages the insulating liners and the other plate then moves independently to lock the winding form in place and thereafter release the winding form.

A compact motion transfer mechanism is described for causing the plates to move together and for permitting one of the plates to move independently of the other during the interval in which the liners are backed up by the other plate.

7 Claims, 9 Drawing Figures

PATENTED AUG 26 1975  3,901,454
SHEET 1 OF 2
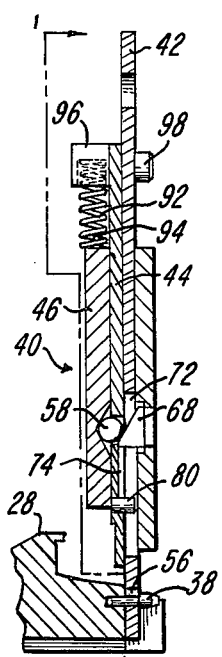
FIG.2
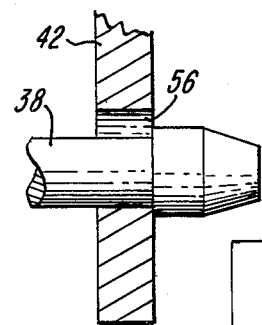
FIG.3
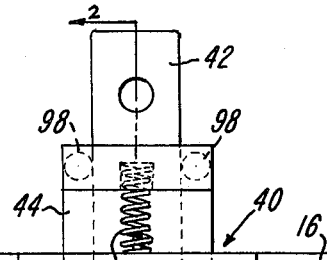
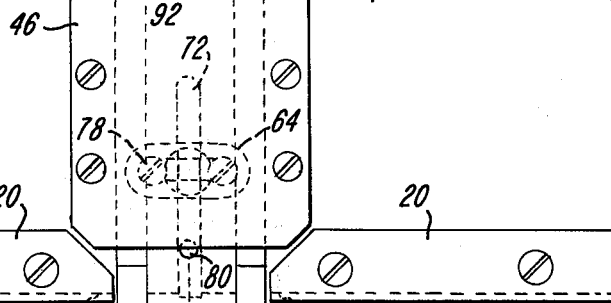
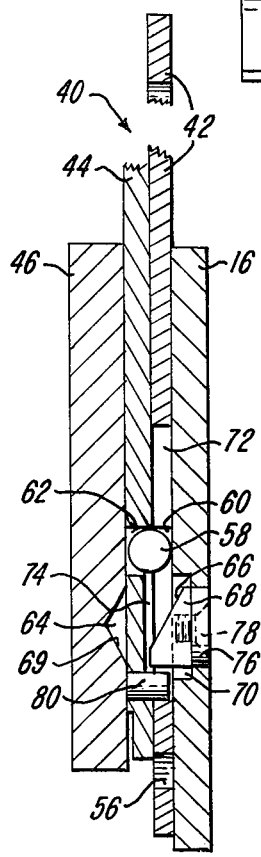
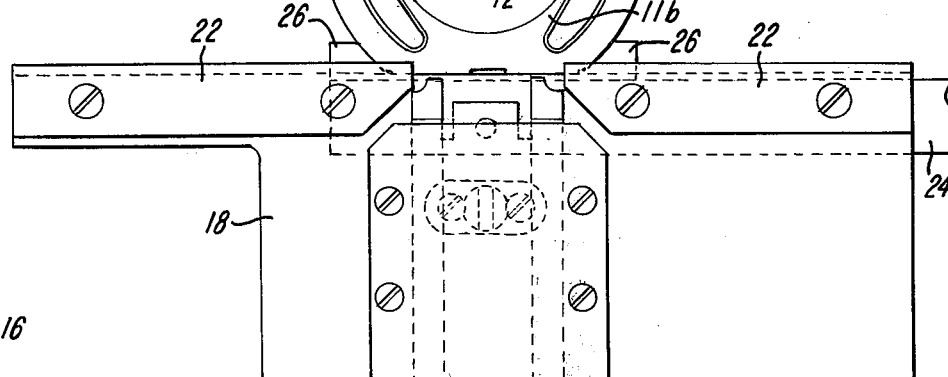
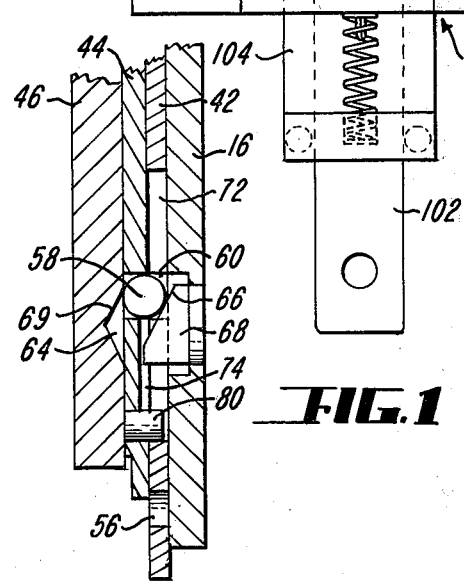
FIG.1
FIG.4    FIG.5
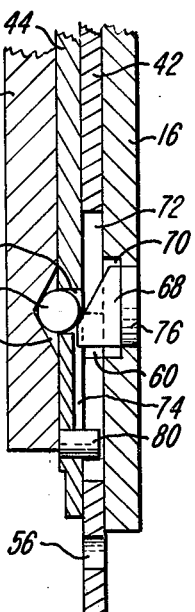
FIG.6

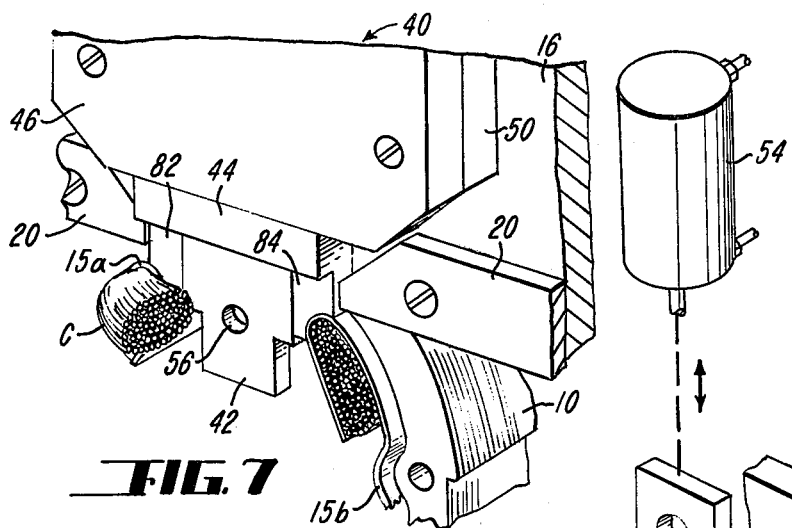
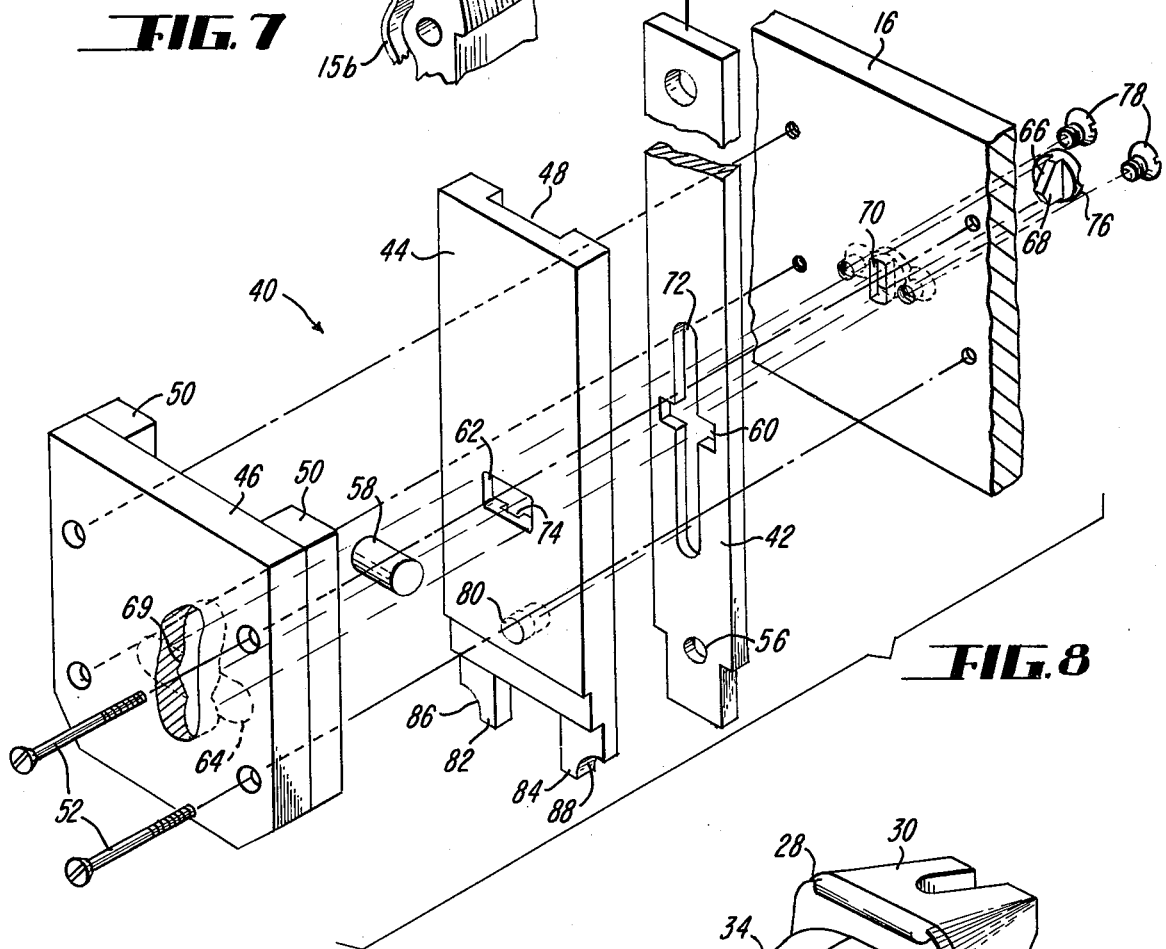
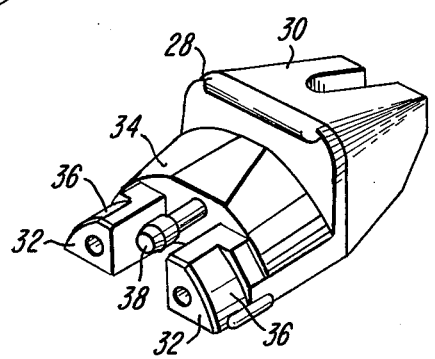

ND INSULATOR BACKUP
FORM RETAINER AND INSULATOR BACKUP ASSEMBLY FOR STATOR WINDING MACHINES

BACKGROUND OF THE INVENTION

The invention herein is disclosed with relation to a two pole stator winder of the type having an oscillating and reciprocating shuttle with two wire guide needles which cooperate with winding forms for simultaneously winding coils on confronting, inwardly directed pole pieces of a stator. The winding forms discussed herein are similar to the winding forms described in U.S. Pat. No. Re. 25,281 granted to Harry W. Moore on Nov. 6, 1962. When a stator is located in position to be wound, the winding forms, of which there are four, are advanced two each from opposite sides of the stator core toward one another and locked into the appropriate relation with respect to the stator core. A presently preferred practice is to provide four form retainer plates, one for each of the four winding forms, which engage locking pins on the winding forms to lock the forms in place during the winding operation. The retainer plates are contiguous to the end faces of the stator core and the end turns of the coils are wound over the retainer plates. When the winding is complete the form retainer plates are removed.

Each retainer plate has an aperture cooperating with the locking pin on its associated winding form. The sequence of operations is first to locate a stator core in the winding position. The form retainer plates are then advanced radially toward the center axis of the stator core. The winding forms are advanced toward one another from opposite sides of the stator core. During this movement of the winding forms, their locking pins are projected through the apertures in the form retainer plates. Immediately thereafter the form retainer plates are moved through a small distance radially outwardly whereupon the locking pins are locked by the margins of the apertures. After the winding of the coils is complete, the retainer plates are moved through the same small distance radially inwardly to permit withdrawal of the winding forms. Subsequently, the retainer plates are moved a substantial distance radially outwardly to free the retainer plates from their position between the coil end turns and the stator faces.

It is common practice to line a substantial portion of the stator core with insulating cells or liners prior to the winding operation. The side edges of the liners project beyond the end faces of the stator cores to prevent engagement between the coils and the core metal. Oftentimes it is desirable or even necessary to provide a backup for the portions of the liners against which the coils are first wound. These portions are immediately adjacent the form retainer plates. Therefore, form retainer plates are frequently constructed with surfaces which back up the liners. Since the surfaces of the retainer plates which back up the liners must be engaged with the liners during the winding operation and radially inward movements of the retainer plates are necessary to permit locking and unlocking of the winding forms, the liners are necessarily pressed inwardly by the backup surfaces during the locking and unlocking movements of the retainer plate. For many stator winding applications the pressing of the liners is unobjectionable, the liners themselves being yieldable and the wound coils also being yieldable to the extent necessary to permit the movements of the retainer plate.

A problem exists, however, when winding coils having relatively large diameter wire with a relatively large number of turns. Such coils often would not yield sufficiently to permit the necessary movements of the form retainer plate when unlocking the winding forms. The problem is especially severe when the insulating liners are relatively thin. In such cases backups are essential because the liners otherwise would almost certainly split during the winding operation. Backup surfaces cannot be provided on the form retainer plates because the rigidity of the coils would not permit the radially inward movements of the retainer plates necessary to disengage them from the locking pins.

SUMMARY OF THE INVENTION

In accordance with this invention a compact assembly is provided for each winding form, each assembly having a form retainer plate and a guide plate with fingers for backing up the cells or liners. The radial position of the form retainer plate is at all times positively controlled by a suitable motive device such as an air cylinder. During a substantial portion of the movement of the form retainer plate, the guide plate is caused to move with the retainer plate. When the plates move radially inwardly and the backup fingers have engaged the insulating liners, the guide plate is restrained against further movement while the form retainer plate is permitted to move as needed to lock and unlock its associated winding form. After the winding operation and while the retainer plate is moved radially outwardly, the two plates are again coupled for movement together so that both plates are removed from adjacent the stator.

Joint movement of the retainer and guide plates is accomplished by locating a roller element in aligned apertures therein, the roller element having a diameter significantly greater than the apertured portion of each plate but less than the combined thickness of the apertured portions of both plates. Fixed plates, located in straddling relation to the retainer and guide plates, have a cam and a detent or recess, respectively, confronting one another. As the retainer and guide plates move radially inwardly, the roller element is engaged by the cam and forced into the recess. The roller element no longer is engaged by the retainer plate so that the retainer plate is free to move radially inwardly by itself. At the same time the roller element is trapped in the recess and the aperture in the guide plate so that the guide plate is locked in position. This position is the position in which the backup fingers have engaged the insulating liners. After the parts have reached this position the retainer plate may undergo the needed movements to lock and unlock the winding forms without affecting the position of the guide plate. When the retainer plate is subsequently moved radially outwardly through a substantial distance, it first engages a pin fixed to the guide plate to positively move the guide plate with it in the radially outward direction. At the same time the roller element rides out of the aforementioned recess and again is lodged in the aligned apertures in the retainer plate and the guide plate. The retainer plate and guide plate remain effectively locked together by the roller element until the foregoing operations are repeated.

BRIEF DESCRIPTION OF THE DRAWINGS

FIG. 1 is an elevational view of a portion of a stator winding machine embodying apparatus made in accordance with this invention.

FIG. 2 is a cross sectional view of a portion of the apparatus of FIG. 1 and taken along section line 2—2 thereof. FIG. 2 also includes view line 1—1 to more clearly indicate the relationship of the parts of FIG. 1.

FIG. 3 is an enlarged cross sectional view of a portion of FIG. 2.

FIGS. 4, 5 and 6 are enlarged, cross sectional views similar to portions of FIG. 2 showing different stages in the operation of the apparatus of this invention.

FIG. 7 is a perspective view of a portion of the apparatus of this invention and illustrating its relationship to a wound stator.

FIG. 8 is an exploded view of the apparatus of this invention.

FIG. 9 is a perspective view of a winding form typical of the winding forms with which this invention may be used.

DESCRIPTION OF THE PREFERRED EMBODIMENT

With reference to FIGS. 1 and 7, a core 10 for a two pole stator is shown in position to be wound with coils C about its pole pieces 11a and 11b by operation of a shuttle mechanism generally designated 12 having wire guide or feed needles 14. The core 10 is insulated by cells or liners 15a and 15b. The construction and operation of such shuttle mechanisms are well known in the art and hence not described or illustrated in detail herein.

The core 10 is positioned in a horizontal track formed by an upper pair of stator locator plates 16 and a lower pair of stator locator plates 18. Only one each of the two pairs of stator locator plates 16 and 18 can be seen in FIG. 1, the others being hidden behind those that are illustrated. Mounted along the lower edge of the upper stator locator plate 16 are flanges 20. Similar flanges 22 are mounted on the upper edge of the lower locator plate 18. The confronting surfaces of the locator plates 16 and 18 engage the upper and lower surfaces of the stator core 10 while the flanges 20 and 22 engage the end face of the core 10. Of course, similar flanges would be mounted on the locator plates which are not illustrated.

More precise positioning of the core 10 in preparation for the winding of coils is obtained by a lever 24 mounted between the two lower locator plates 18 and having core engaging members 26. The lever 24 is pivotally mounted and driven by an air cylinder (not shown) from a position wherein the members 26 are beneath that illustrated in FIG. 1 and into the FIG. 1 position so as to precisely locate the stator core 10 relative to the shuttle 12. It should be noted that the track structure as thus far described as well as the lever 24 may take any suitable form and are not a part of this invention.

This invention is concerned in part with a mechanism for locking a winding form, such as that illustrated at 28 in FIGS. 1, 2 and 9, in fixed relation to the stator core 10. The winding form 28 is similar to those described in the aforementioned Moore patent and has a wire guide surface portion 30 over which wire emanating from one of the needles 14 is guided into coil forming relation about the pole piece 11a. The form 28 illustrated in FIG. 9 includes apertured receptacle portions 32 for receiving pins which insure alignment between the form 28 and a mating form (not shown) which is extended toward the core 10 from the opposite side thereof. During the subsequent winding operation, coils are formed in part over an arcuate surface 34 on the form 28 and around the pole piece 11a. During this time, other arcuate surface portions 36 are engaged with the radially innermost surface of the pole piece 11a and held thereagainst, as will be hereafter further described, by means engaging a locking pin 38 forming part of the winding form 28.

This invention is also concerned with providing a support or backup for the bight portions of the insulating cells or liners 15a and 15b immediately adjacent the pole pieces 11a and 11b. These parts of the liners must be backed up, especially when winding with relatively heavy wire, because the tension placed on the wire during the winding cycle is frequently sufficient to cause parts of the liners to split apart, thereby creating the possibility that the wire will directly engage the stator core metal.

In accordance with this invention the winding forms are retained in place relative to the stator core 10 and the insulating liners 15a and 15b are backed up by a compact assembly having a single drive source. The assembly for accomplishing these functions in association with the winding form 28 will now be described.

With reference to FIG. 8, the assembly of this invention is generally designated 40 and comprises a form retainer plate 42, a form retainer guide plate 44, and a detent or top plate 46. The guide plate 44 has a channel 48 extending its entire length. Channel 48 is substantially the same depth as the thickness of the form retainer plate 42. When the parts illustrated in FIG. 8 are assembled, the form retainer plate 42 is mounted within the channel 48 and guided by the sides of the channel 48 for movement perpendicular to the track. The guide plate 44 is in turn mounted and guided for sliding movement between spacer bars or flanges 50 on the face of the top plate 46 confronting the locater plate 16. The plates 42, 44 and 46 are assembled onto the locater plate 16 and affixed thereto such as by bolts 52 projecting through aligned apertures in the plate 46 and the bars 50 and into the locater plate 16. When assembled, the plates 16 and 46 and the bars 50 form a vertical channel perpendicular to the track structure for slidably receiving and guiding the guide plate 44. The faces of the plate 42 and the plate 44 bear against the confronting face of the locater plate 16, and are mounted for movement radially of the center axis of the core 10.

As diagrammatically illustrated in FIG. 8, the form retainer plate 42 is driven linearly along the channel 48 by a double acting air cylinder or the like 54. As best shown in FIGS. 2 and 3, the lower end of the retainer plate 42 is apertured at 56 for the purpose of receiving and lockingly engaging the locking pin 38.

The assembly 40 additionally includes a motion transferring roller element 58 which, as illustrated, is preferably cylindrical. The roller element 58 occupies a first or motion transferring position shown in FIG. 4 wherein it is located in slots 60 and 62 in the form retainer plate 42 and the guide plate 44, respectively, and is retained within the slots 60 and 62 by the comfronting faces of the locater plate 16 and the top plate 46. When retained in the slots 60 and 62, the roller element 58 directly imparts any movement of the reatiner plate 42 to the guide plate 44. As apparent, the diameter of the roller element 58 exceeds the thickness of the slotted portion of either the retainer plate 42 or the guide plate 44 but is less than the combined thickness thereof.

Roller element 58 also occupies a second position shown in FIGS. 2 and 6 wherein it is received within the guide plate slot 62 and a detent or recess 64 in the top plate 46. When so located the roller element 58 is effective to lock the guide plate 44 in fixed relation to the top plate 46 and hence in fixed relation to the locater plate 16 and the stator core 10.

As shown in FIG. 5 and as further described below, the roller element 58 is moved from the first position to the second position by a sloping surface 66 of a cam 68 projecting from the face of the locater plate 16 confronting the top plate 46. It is moved from the second position back to the first position by a sloping cam surface 69 forming part of the base of the recess 64 when plates 42 and 44 move radially outwardly.

The cam 68 projects through an end milled slot 70 in the locater plate 16 which confronts the detent or recess 64 through a longitudinally extending slot 72 in the form retainer plate 42, which intersects and extends in both directions beyond the transverse slot 60. Also, the tip of cam 68 projects into a longitudinally extending groove 74 in the base of the lower portion of the guide plate channel 48. The cam 68 has a circular base 76 received within a circular counterbore in the locater plate 16. It is fixed to the locater plate 16 by flat head screws 78. It may be noted that the cam base 76 is cut away to permit the faces of the flat head screws 78 to be flush with the rear face of the locater plate 16. Flush mounting of the cam element 66 is desirable because in many cases the two upper locater plates 16 and the two lower locater plates 18 are mounted so close to one another that there is insufficient room for projecting screw heads or the like.

Roller element 58 is only capable of driving the guide plate 44 during the initial portion of the downward motion of the form retainer plate 42. The assembly 40 further includes a drive pin 80 affixed to the guide plate 44 which is engaged and driven by the base of the longitudinal slot 72 during the radially outward or upward travel of the form retainer plate 42. For reasons which will become apparent the lowest or radially innermost point of the drive pin 80 is spaced from the center of the guide plate slot 62 by a spacing identical to the spacing between the center of the retainer plate slot 60 and the lowest point of the longitudinally extending slot 72 therein.

As shown in FIG. 7, the assembly 40 is so located with respect to the stator core 10 during the winding operation that the form retainer plate 42 is contiguous to an end face of the stator core 10, and the end turns of the coil C are wound over the retainer plate 42. The lower end of the guide plate 44 is cut away to form downwardly projecting fingers 82 and 84 straddling the retainer plate 42 and having arcuate surfaces 86 and 88, respectively, adapted to serve as backups for the insulating liners 15a and 15b. Accordingly, the fingers 82 and 84 are also contiguous to the end face of the stator 10.

The operation of the assembly 40 is illustrated in connection with FIGS. 2 through 6. Referring first to FIG. 4, the parts are in the position they occupy when winding forms such as the winding form 28 are not in the winding position. It will be observed that the plates 42 and 44 are retracted to a position wherein their lower ends are above the lower margin of the locater plate 16. When a stator core such as core 10 is to be wound, the form retainer plate 42 is driven by the air cylinder 54 vertically downwardly so as to locate the aperture 56 therein in position to receive the locking pin 38. At the same time the guide plate 44 is driven vertically downwardly so as to bring the fingers 82 and 84 into engagement with the insulating liners 15a and 15b. During the initial downward movement of the retainer plate 42, the guide plate 44 moves therewith because the motion transferring roller 58 is confined within the aligned recesses 60 and 62.

FIG. 5 shows the position of parts when the guide plate 44 approaches the end of its downward travel. At this time the roller element 58 engages the cam surface 66. Continued downward movement of the form retainer plate 42 results in the roller element 58 being forced by the cam surface 66 out of the transverse slot 60 and into the recess 64. When the backup fingers 82 and 84 have engaged the insulating liners, the roller element 58 is completely removed from the retainer plate slot 60 and, as shown in FIG. 6, lodged within the recess 64 and the guide plate slot 62. Accordingly, the guide plate 44 is locked in fixed relation to the top plate 46. Further travel of the form retainer plate 42 downwardly from its position shown in FIG. 6 is thus unaccompanied by any movement of the guide plate 44.

The form retainer plate 42 is driven further downwardly from that position illustrated in FIG. 6 to permit the winding form 28 to be extended into engagement with the stator pole piece 11a. At this time the aperture 56 is positioned in centered alignment with the locking pin 38. Immediately thereafter the air cylinder 54 retracts the form retainer plate 42 until the lower margin of the aperture 56 snugly engages the locking pin 38 immediately behind its enlarged head portion. Air pressure is maintained in the cylinder 54 so as to hold the winding form 28 firmly against the pole piece 11a throughout the winding operation. This position of parts is shown in FIG. 2 with the relationship between the aperture 56 and the locking pin 38 shown in the enlarged section of FIG. 3.

When the winding of coils is complete, cylinder 54 is energized to again extend the form retainer plate 42 downwardly to center the aperture 56 relative to the locking pin 38 to enable removal of the winding form 28. Immediately after the winding form 28 is removed, cylinder 54 is energized to retract the form retainer plate 42 in an upwardly direction. During the retraction of the form retainer plate 42, the lower margin of the longitudinal slot 72 therein engages the drive pin 80, thereby causing the guide plate 44 to move upwardly with the form retainer plate 42. During the initial upward movement of the guide plate 44, the roller element 58 is cammed by the sloping recess surface 69 into the slot 60 in the form retainer plate 42. Hence the parts return to the position thereof illustrated in FIG. 5 with the roller element 58 again drivingly coupling the form retainer plate 42 and the guide plate 44. Ultimately the parts return to the position thereof illustrated in FIG. 4, in readiness to repeat the foregoing operations for winding another stator.

The cam surface 66 should be parallel to the confronting recess base surface 69. Otherwise the roller element 58 may be wedged therebetween, making it difficult or impossible to move the guide plate 44. In the event there is some misalignment of parts, it may be desirable to provide a spring 92 shown in FIGS. 1 and 2 coacting between the guide plate 44 and the top plate 46. The spring 92 may be of benefit to prevent the roller element 58 from becoming wedged in the recess 64. The spring 92 may encircle a pin 94 projecting from the upper edge of the top plate 46 and received within a bore of a flange 96 bolted as indicated at 98 to the top plate 44.

Referring again to FIG. 1, an assembly 100 which is identical in construction and function to the assembly 40 is mounted on the lower stator locater plate 18 and it will, of course, be understood that there are two other identical assemblies which are hidden from view by the assemblies 40 and 100 mounted on the stator locater plates on the opposite side of the stator core 10. As obvious, both assemblies mounted on the upper locater plate 16 may be driven by a single air cylinder, such as cylinder 54. The same is true of the assemblies mounted on the lower locater plate 18. FIG. 1 shows a relationship of parts which would not exist in actual operation because the winding form 28 is locked in position and no lower corresponding winding form is illustrated. Also the form retainer plate 102 and the guide plate 104 of the assembly 100 are shown in their retracted positions. These liberties were taken with FIG. 1 in order to illustrate the extended and retracted position of parts.

It should be observed that the stator locater plates function as cam plates for supporting the cams 68. Obviously separate cam plates could be provided for the same purpose. The structure illustrated, however, is extremely compact, there being only the thickness of plates 44 and 46 added to the locater plate 16.

Although the presently preferred embodiment of this invention has been described, it will be understood that within the purview of this invention various changes may be made within the scope of the appended claims.

Having thus described my invention, I claim:

1. For use in a stator winding machine of the type adapted to wind coils around pole pieces and having winding forms for guiding wire from a winding shuttle into coiled relation to the pole pieces, the stator to be wound having insulating liners, parts of which require backup during the coil winding operation, the improvement comprising a first plate having means thereon for retaining a winding form adjacent to a stator pole piece, a second plate having fingers straddling said first plate and shaped to provide backup for portions of the insulating liners, motive means for moving said first plate toward and away from locking relation to said winding form and motion transfer means coacting between said first plate and said second plate whereby movement of said first plate toward the position wherein it is locked to said winding form is accompanied by movement of said second plate into a position whereat said fingers engage the insulating liners, means for retaining said second plate in said last mentioned position while permitting said first plate to be moved as required to lockingly engage said winding form, and means for driving said second plate with said first plate upon retraction of said first plate away from its position whereat it engages said winding form.

2. For use in a stator winding machine, a form retaining and insulating backup assembly including a form retainer plate adapted to interlock with a coil winding form to maintain the form in proper location relative to a stator to be provided with coils, a guide plate having insulation engaging fingers straddling said form retainer plate, means for driving said form retainer plate linearly toward and away from a locking position relative to a winding form, motion transfer means coupling said form retainer plate and said guide plate throughout a substantial portion of movement of said form retainer plate whereby said guide plate is caused to move therewith, the motion of said guide plate in one direction being sufficient to cause said fingers to be located in supporting relation to the insulating liners of a stator to be wound, and means for disengaging said motion transfer means from said form retainer plate whereby said form retainer plate may be moved relative to said guide plate as needed to lock a winding form in place.

3. The assembly of claim 2 wherein said guide plate has a groove along its length and said form retainer plate is retained in and guided by said groove.

4. The assembly of claim 2 wherein said motion transfer means includes a roller element, said form retainer plate having an aperture therein receiving said roller element, said guide plate having an aperture therein also receiving said roller element, the thickness of the apertured portions of each of said form retainer plate and said guide plate being less than the diameter of said roller element, and the assembly further including a cam plate, a detent plate having a recess for receiving a portion of said roller element, said cam plate having a sloping cam surface confronting said recess, said form retainer plate having an elongate longitudinally extending slot transversely intersected intermediate its ends by said first mentioned aperture into which said cam surface extends whereby movement of said form retainer plate toward its form locking position causes said roller element to engage and roll along said cam surface and thus be removed from said first mentioned aperture and located in said guide plate aperture and said recess.

5. A compact plate driving assembly comprising a drive plate adapted to be connected to a linear drive mechanism, a driven plate contiguous to said drive plate, said aforementioned plates being sandwiched between a cam plate and a detent plate, said drive plate having an elongate, longitudinally extending slot, said cam plate having a cam element projecting into said slot, said drive plate further having an aperture therethrough intermediate the ends of said slot, said driven plate having an aperture therethrough substantially coextensive and adapted to be aligned with the aperture in said drive plate, a roller element having a diameter exceeding the thickness of the apertured portions of either of said drive plate and said driven plate and less than the combined thickness of said drive plate and said driven plate for coupling said plates to cause said driven plate to move with said drive plate, said detent plate having a recess aligned with said cam element, said cam element being constructed to engage said roller element as said apertures become aligned with said cam element whereby said roller element is, upon continued movement of said drive plate, thrust by said cam element from said aperture in said drive plate into a location wherein it is lodged within said aperture in said driven plate and said recess whereby said drive plate may be moved relative to said driven plate with said driven plate held in fixed relation to said cam plate and said detent plate.

6. The assembly of claim 5 wherein said driven plate has a groove along its length and said drive plate is retained in and guided by said groove, said cam plate engaging said drive plate and portions of said driven plate adjacent said groove and said detent plate engaging the opposite side of said driven plate.

7. A stator winding machine of the type having a track structure supporting a stator to be wound, said track structure including stator locater plates, and of the type having winding forms for guiding wire from a winding shuttle into coiled relation to stator pole pieces, the stator to be wound having insulating liners, parts of which require backup during the coil winding operation, the improvement comprising a winding form retainer and insulator backup assembly including a top plate affixed to the face of one of said stator locater plates, spacer bars between said stator locater plate and said top plate, said bars and said plates defining a channel perpendicular to the track, a guide plate slidably mounted in said channel, said guide plate having a groove confronting said stator locater plate and perpendicular to the track, a form retainer plate slidably mounted in said groove, motive means for driving said retainer plate in a direction perpendicular to the track, and motion transfer means coacting between said form retainer plate and said guide plate whereby movement of said form retainer plate toward the track is accompanied by movement of said guide plate, said guide plate having insulator backup fingers, and means for restraining movement of said guide plate when said fingers engage insulating liners on a stator to be wound and permitting said retainer plate to be moved as required to engage and retain a winding form.

* * * * *